Feb. 23, 1943.  R. E. POWELL  2,311,776
METHOD OF MAKING SOLDERING DEVICES
Filed June 12, 1940
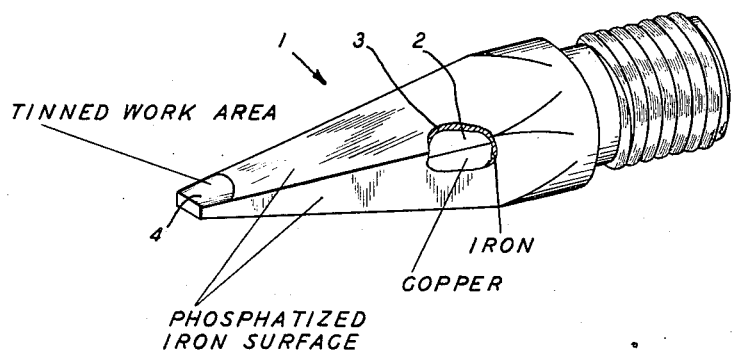
INVENTOR
R.E. POWELL
BY
E.R. Nowlan
ATTORNEY Patented Feb. 23, 1943

2,311,776

UNITED STATES PATENT OFFICE 2,311,776

METHOD OF MAKING SOLDERING DEVICES

Raymond E. Powell, Westfield, N. J., assignor to Western Electric Company, Incorporated, New York, N. Y., a corporation of New York Application June 12, 1940, Serial No. 340,036

2 Claims. (Cl. 113—105)

This invention relates to a method of making a soldering device and more particularly to a method of making an iron coated or "armored" tip for soldering irons.

In the production of apparatus used in the telephone and radio fields especially as well as in other arts, there are innumerable instances where close, neat soldering is required, as, for example, in securing the myriad soldered connections of telephone apparatus, radio apparatus and the like. Ordinary massive copper soldering iron tips show some disadvantages for such use, especially where production line methods are used in quantity production. Such tips both corrode and wear away quickly, and in severe and constant use may soften and bend. Hence tips for such service may be made of iron or of copper or other high thermal conductivity material coated externally with iron to have an iron wearing surface. Such soldering irons are generally satisfactory so far as the above noted disadvantages of copper tips are concerned but are subject to the annoying feature that in use the solder "creeps" from the purposely tinned area of the iron, intended for use in soldering, over the rest of the exposed iron surface, interfering with the production of the sharply defined, small and neat soldered unions required.

An object of the present invention is to provide a simple and reliable method of making a soldering iron tip, of iron, iron coated copper or the like, in which the solder used therewith in soldering will not tend to creep beyond the purposely tinned area of the tip.

The soldering iron tip produced by the method herein disclosed is not herein claimed, being disclosed and claimed in copending application Serial No. 365,048, filed on Nov. 9, 1940, by the present inventor.

With the above and other objects in view, the invention may be embodied in a method of making a soldering iron tip having an iron surface which comprises steps of tinning over the desired working area only of the iron surface, and subsequently subjecting the iron surface to a phosphating treatment to coat all the untinned surface of the tip with a phosphate coating upon which solder will not creep.

Other objects and features of the invention will appear from the following detailed description of an embodiment thereof taken in connection with the accompanying drawing in which the single figure is a view in perspective of a detachable soldering iron tip constructed by the method of the invention.

As herein disclosed the invention presents a detachable tip for a soldering iron, generally indicated at 1, having a body 2 of copper or copper alloy coated with an armor 3 of iron. In the particular instance here illustrated only a small portion 4 of one face of the wedge-shaped tip is to be used for soldering and is "tinned," i. e. coated with adherent solder. The rest of the outer iron surface of the tip is phosphatized, i. e., treated to have a closely adherent surface layer of iron phosphate material, ordinarily a mixture of basic phosphates of iron.

To produce this tip the copper body 2 is formed in any suitable manner and coated with iron electrolytically to form the armor 3. The area 4 of the surface of the armor is cleaned thoroughly, if necessary with a fine abrasive, while the iron is hot, covered with a suitable flux, e. g. a mixture of zinc chloride and ammonium chloride in water solution, and dipped into hot molten solder. The solder will form a closely adherent film on the cleaned area 4 only. The whole is then allowed to cool, at least to about 212° F., after which it is lightly sand blasted. It is then submerged in a suitable phosphatizing bath for such time as is necessary to form a suitable phosphate coating on all the exposed iron surfaces. After being thoroughly rinsed in hot water and dried, the tip is ready for use.

A suitable solution for the phosphatizing may be prepared by mixing 37½ gallons of water, 7 pounds of 85% orthophosphoric acid and 2 pounds of finely divided iron. This bath is heated to about 212° F. for use in producing the phosphated surface on the iron by immersion of the iron therein. It dulls the solder coated area 4 but does not attack or injure the solder appreciably.

When an iron or iron armored soldering tip, treated in the manner above described, is put into use, it is found that the phosphatized iron surface appears to be unwettable by and even perhaps repellent to molten solder. There is no creeping of solder from the area 4 over the adjacent surface of the tip, no matter how continuously the soldering iron having the tip is used. Hence the soldering iron remains, apparently indefinitely, available for close, neat precise work, without any need for the frequent cleaning of the whole tip and retinning of the working area 4 required when an unphosphatized iron or iron armored tip is used.

While it has been implied in the foregoing that the entire iron surface outside of the working area 4 is phosphatized, it will be evident that the main purpose of the invention will be satisfied if only a sufficient portion of the non-working area adjacent to and surrounding the area 4 be phosphatized to prevent the creeping of solder thereover and onto the non-phosphatized area beyond.

The embodiment of the invention herein disclosed is illustrative and may be modified and departed from in various ways without departing from the spirit and scope of the invention as pointed out in and limited only by the appended claims.

What is claimed is:

1. The method of treating an iron-surfaced tip for a soldering iron which method comprises steps of first tinning the working area only of the surface of the tip, and secondly subjecting the surface of the tinned area and the portions of the remaining iron surface adjacent thereto to the action of a phosphatizing agent which will phosphatize the surface of the iron to render the same non-wettable by molten solder without materially affecting the surface of the tinned area.

2. The method of treating an iron-surfaced tip for a soldering iron which method comprises steps of first tinning the working area only of the surface of the tip, and secondly dipping the surface of the tinner area and the portions of the remaining iron surface adjacent thereto into a solution comprising phosphoric acid to phosphatize the dipped iron surface to render the same non-wettable by molten solder without materially affecting the surface of the tinned area.

RAYMOND E. POWELL.